Figure 6:
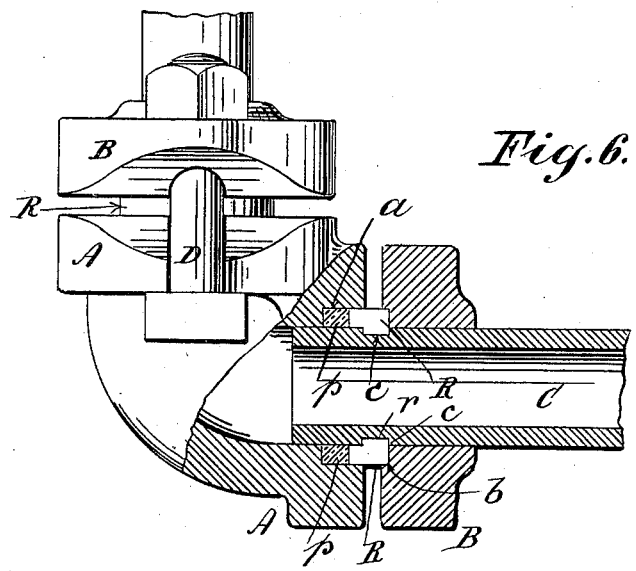

No. 608,613. Patented Aug. 9, 1898.
F. A. LINICH.
PIPE JOINT AND CONNECTION.
(Application filed Feb. 17, 1898.)
(No Model.) 3 Sheets—Sheet 1.
Fig. 1.
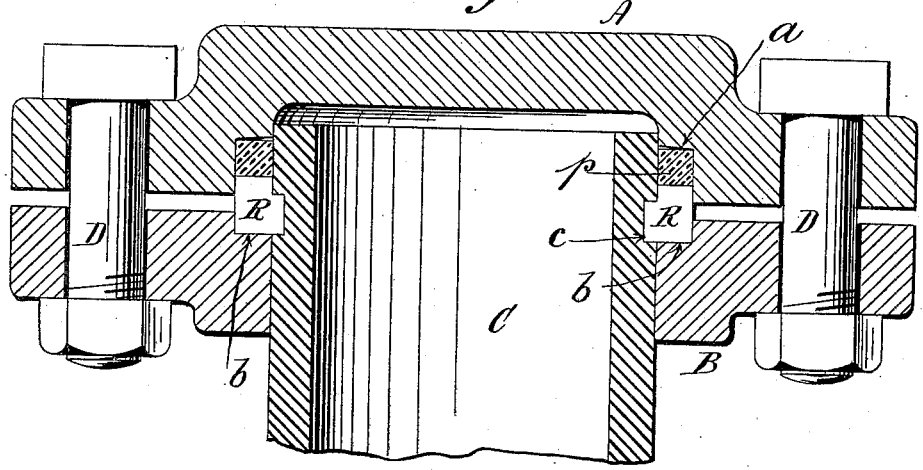
Fig. 2.
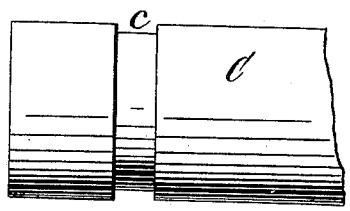
Fig. 3. Fig. 4. Fig. 5.
 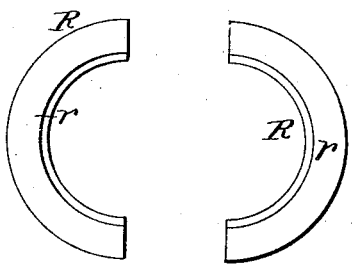 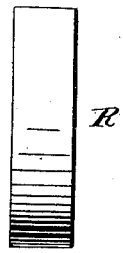
Witnesses:
D. W. Gardner.
H. S.
Inventor:
Frank A. Linich
By his Attorney
George William Miatt No. 608,613. Patented Aug. 9, 1898.
F. A. LINICH.
PIPE JOINT AND CONNECTION.
(Application filed Feb. 17, 1898.)
(No Model.) 3 Sheets—Sheet 3.

Witnesses:

Inventor:
Frank A. Linich
By his Attorney
George William Miatt

UNITED STATES PATENT OFFICE.

FRANK A. LINICH, OF NEW YORK, N. Y.

PIPE JOINT AND CONNECTION.

SPECIFICATION forming part of Letters Patent No. 608,613, dated August 9, 1898.

Application filed February 17, 1898. Serial No. 670,624. (No model.)

*To all whom it may concern:*

Be it known that I, FRANK A. LINICH, a citizen of the United States, residing in the city, county, and State of New York, have invented certain new and useful Improvements in Pipe Joints and Connections, of which the following is a specification sufficient to enable others skilled in the art to which the invention appertains to make and use the same.

My invention relates to means for closing or sealing the joints of pipes or conduits either at terminals, at places where pipes are coupled end to end, or where pipes are joined at an angle, as in tapping. In fact, it is applicable in all cases where a simple but absolutely tight joint is desirable and especially in the case of pipes or conduits for ammonia or other highly-volatile substances.

The main object of my invention is to dispense with the use of screw-threads and all the attendant objections thereto and at the same time afford a simple, inexpensive, but effective joint adaptable to all the varying requirements of practical use.

The ordinary threaded joint deteriorates with time and is frequently a cause of leakage, besides being difficult and expensive to make. In an emergency the necessity for forming the screw-thread is a great disadvantage, frequently causing exceptional delay and loss before the proper thread-cutting appliances can be obtained. Furthermore, the operation of screw-cutting requires considerable care and skill. All this I obviate by my invention, which may be carried into effect in an emergency whenever a simple pipe-cutting implement or equivalent device is available.

The invention consists, essentially, in forming upon the exterior of the pipe to be united or sealed an annular groove and in using in connection therewith a split ring fitting in said groove and projecting beyond the periphery of the pipe, said ring being confined in place by and constituting a shoulder for the flanges by and between which the packing material is compressed.

In carrying out my invention practically I do not necessarily confine myself to the identical form and construction of parts shown and described, since it is obvious that various modifications may be made therein without departing from the spirit and intent of my invention.

Figure 7:
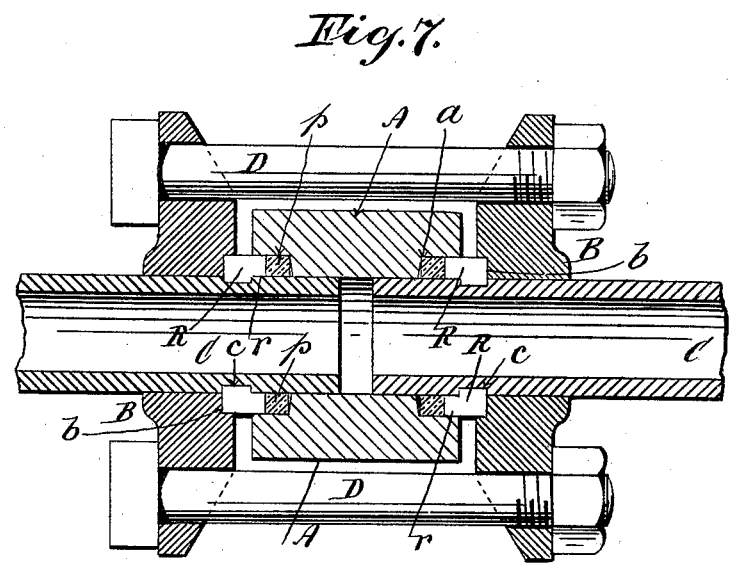
Figure 8:
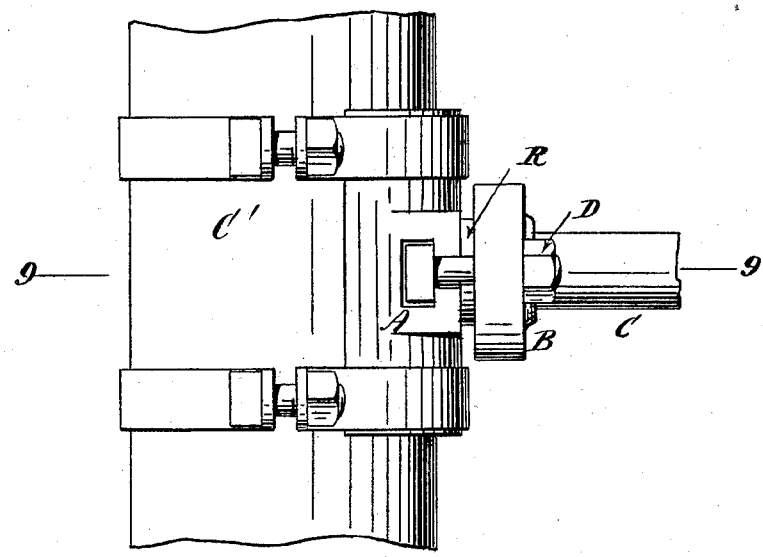

In the accompanying drawings, which are used by way of illustration only, Figure 1 is a transverse section showing the sealing of the end of a pipe or cylinder according to my improved method. Fig. 2 is a view of the exterior of the end of a pipe formed with an annular groove for the reception of my split packing-ring. Figs. 3, 4, and 5 are detail views of the split packing-ring. Fig. 6 is a sectional elevation of an elbow-joint, illustrating the application of my invention thereto. Fig. 7 is a sectional elevation illustrating the application of my invention to the coupling of two pipes end to end. Fig. 8 is a side elevation, and Fig. 9 a cross-section upon plane of line 9 9, Fig. 8, illustrating the application of my invention to the tapping of one pipe into another. Fig. 10 is a view similar to Fig. 3 of one-half of the split ring.

In the drawings, A represents the head, flange, or sleeve, in which the packing-groove $a$ is formed. $p$ represents the packing, of any desired or appropriate material. B is the follower head or flange, in the inner face of which is formed the annular groove $b$. This groove $b$, together with the groove, $a$ is preferably of a diameter but slightly in excess of that of the split ring R, so as to fit over the peripheral surface of the ring and lock and confine it in position, as illustrated in the drawings. The internal diameter of the split ring is less than the external diameter of the pipe or conduit C, to which it is to be applied, the latter being formed with an annular groove or recess $c$ for the reception of the inner side of the ring R.

As shown in most of the drawings, the split ring R is preferably formed with a flange or extension $r$, which overlaps the periphery of the pipe; but it may be formed without this flange $r$, as shown in Fig. 10, with like result in so far as the packing is concerned, the object of the flange $r$ being to protect and reinforce the edges of the groove $c$ against distortion or modification in form under the force exerted upon and by the ring.

In the simpler form of joint shown in Fig. 1, which illustrates the closing of the end of a pipe, cylinder, or reservoir, the head A constitutes a cap, in the inner surfaces of which the packing-groove $a$ is formed, while the follower B, having the surface flange $b$, is clamped to the head A by screw-bolts D, the ring R, resting in the groove $c$, preventing movement longitudinally with relation to the pipe C in either direction.

In the elbow-joint shown in Fig. 6 the packing-groove $a$ is formed directly in the flange A of the elbow, which to all intents and purposes is the equivalent of the head A shown in Fig. 1 and the sleeve A shown in Fig. 7. In the latter case, Fig. 7, it will be seen that the conditions are substantially as those shown in Fig. 6, the only distinction being that Fig. 6 illustrates an angular joint, while Fig. 7 illustrates a straight joint.

Figure 9:
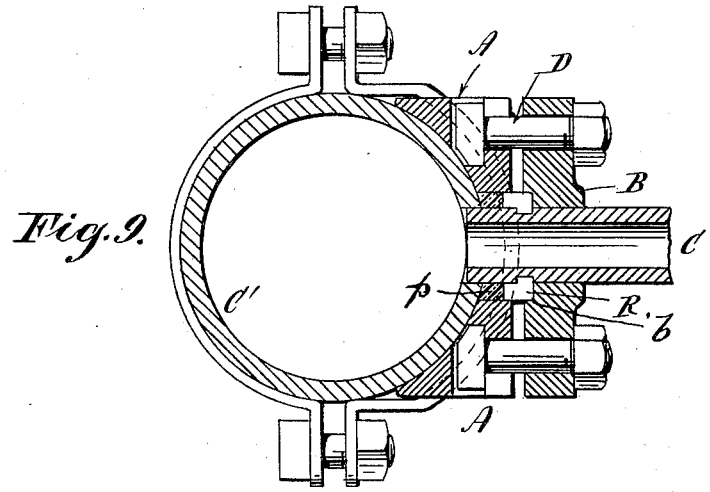
Figure 10:
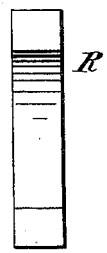

In Figs. 8 and 9 the head A is clamped to and becomes practically a part of the larger pipe C', into which the smaller pipe C is to be tapped, the bottom of the groove $a$ in this case being formed and constituted by the peripheral surface of the larger pipe C'. In other respects it will be seen that the construction and operation of the parts are essentially the same as in the other figures.

It is obvious that instead of having the groove $c$ annular and continuous it may be modified by the formation of two or more peripheral recesses in the pipe C, into which parts of the split ring may be made to project; furthermore, that the ring itself may be made in more than two pieces, if desired; but these and other modifications which may be made would not evade the spirit and intent of my invention in this respect, which consists, broadly, in fitting a split ring into the peripheral surface of a pipe C in such manner that such ring will constitute a shoulder or bearing for the packing upon one side and for the packing-flange upon the other. Likewise it is obvious that the face groove $b$ may be omitted from the flange B without rendering the device inoperative, although it is desirable to have the ring R fit into both the face of the follower B as well as into the head A, so as to lock it effectually in position in the groove $c$. The groove $c$ may be formed by an ordinary pipe-cutter in case of necessity or by any other available means much more quickly and conveniently than the end of the pipe could be threaded. Moreover, my joint thus constructed requires less time and labor to apply and seal, since under any condition one man can put together the parts and screw up the bolts D, whereas it requires a comparatively large expenditure of power to screw up the old form of joint in place, especially when the joint is of large size. Practically it does away with the necessity of pipe-tongs, chain-tongs, wrenches, &c., a bolt-wrench or equivalent being the only implement necessary in effecting the application of my joint. Furthermore, I attain a more perfect and enduring joint, which may be tightened from time to time, if necessary.

It will be seen that by my improvements I can tap a pipe, as shown in Figs. 8 and 9, without disturbing or severing the latter and without the use of a T-coupling, an advantage of great practical importance in many instances, especially where the pipe to be tapped is difficult of access or necessarily permanent in position.

What I claim as my invention, and desire to secure by Letters Patent, is—

1. In a joint substantially such as described the combination of the pipe C, formed with a peripheral recess, the split ring R, engaging with said peripheral recess, the head A, formed with a packing-recess $a$, the packing $p$, the follower B, and means for forcibly securing the head A, and follower B, together, substantially in the manner and for the purpose described.

2. The combination of the pipe C, formed with the peripheral recess $c$, the split ring R, fitting in said recess, the head or flange A, formed with a packing, the groove $a$, the packing $p$, the follower B, formed with the face groove $b$, for the reception of the split ring R, and means for forcibly securing the head or flange A, and the follower B, together, substantially in the manner and for the purpose described.

3. The combination of the pipe C, formed with the peripheral recess $c$, the split ring R, formed with the flange $r$, the head or flange A, formed with the packing-groove $a$, the follower B, and means for forcibly securing the head or flange A, and the follower B, together, substantially in the manner and for the purpose described.

FRANK A. LINICH.

Witnesses:
  D. W. GARDNER,
  GEO. WM. MIATT.